*INVENTORS*
Harold A. Strickland, Jr.
Benjamin R. Purvin
Donald W. Riddell
Maurice A. Crews
*ATTORNEY*

Jan. 10, 1950     H. A. STRICKLAND, JR., ET AL     2,493,785
ARTICLE HEATING AND DELIVERY APPARATUS
Filed Oct. 11, 1947                                     16 Sheets-Sheet 5
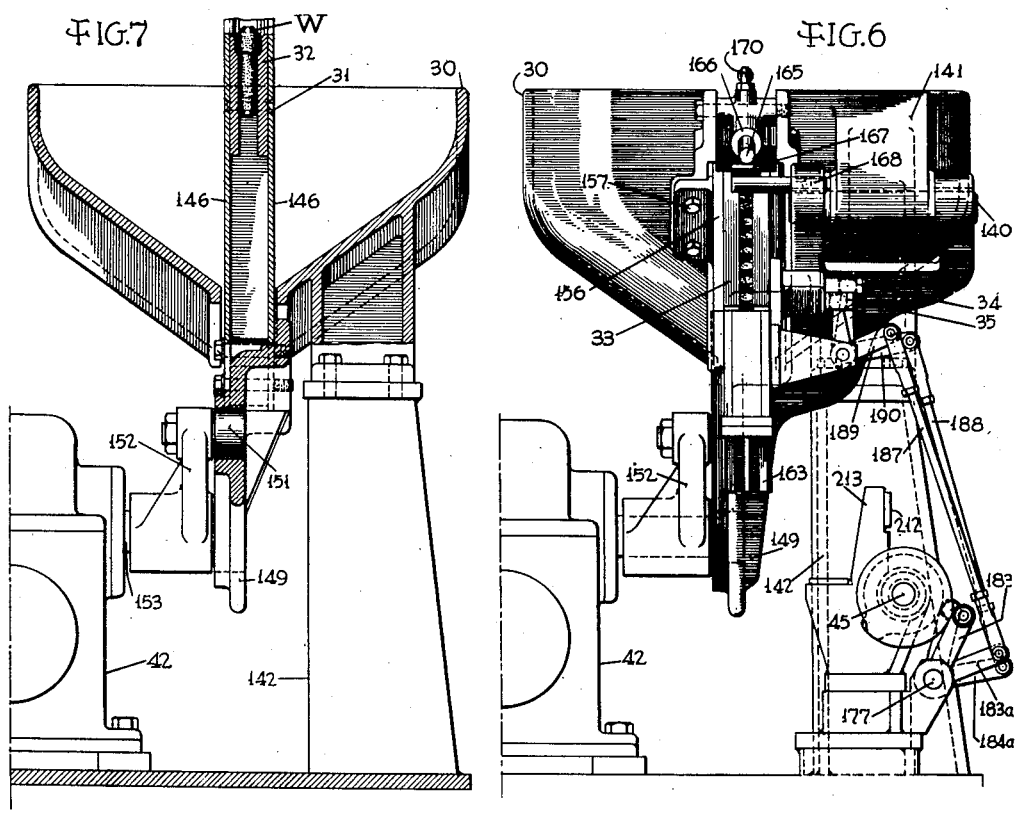
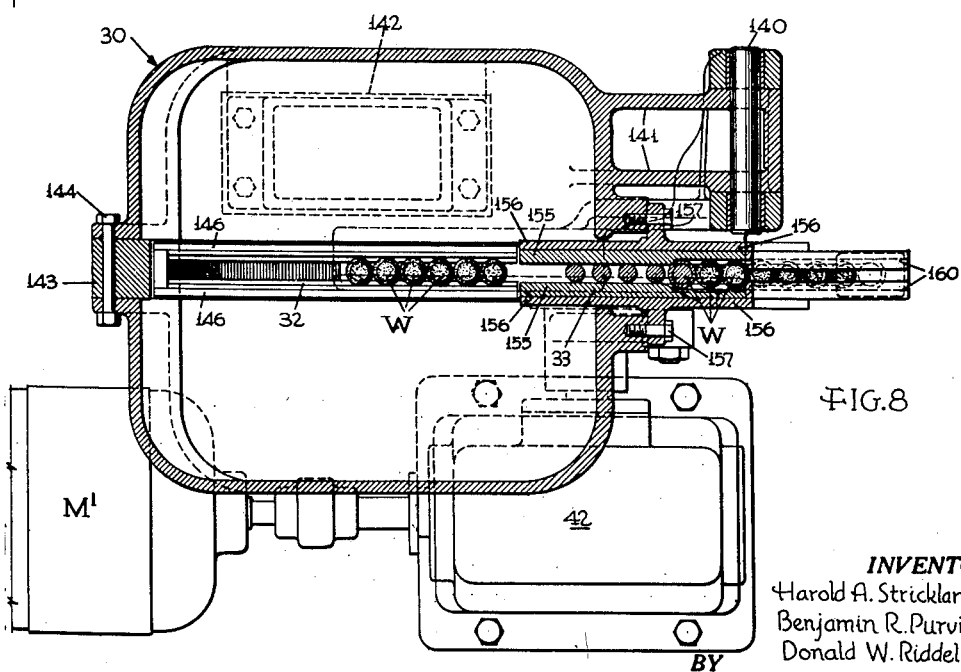
INVENTORS
Harold A. Strickland, Jr.
Benjamin R. Purvin
Donald W. Riddell.
BY Maurice A. Crews
ATTORNEY

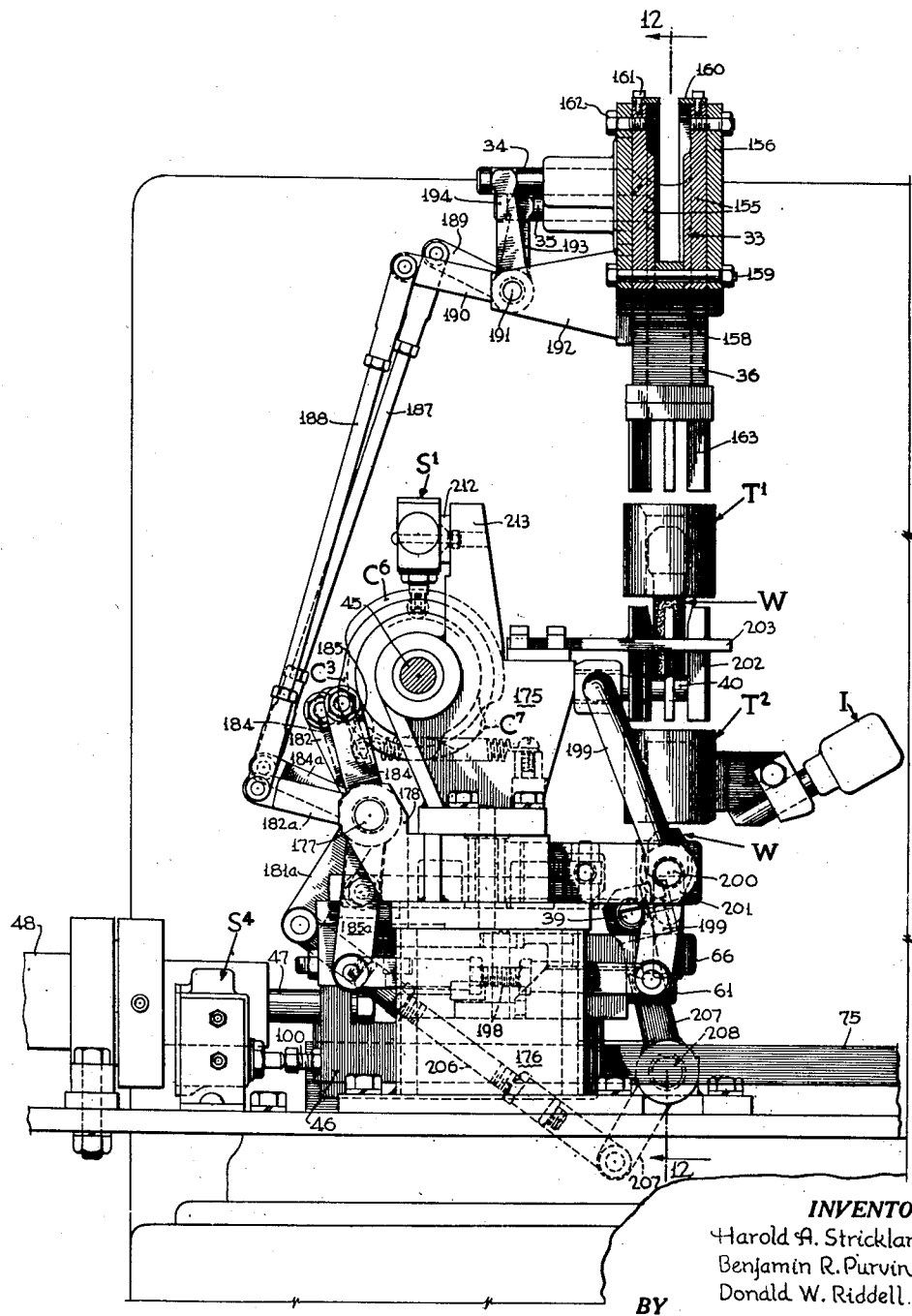

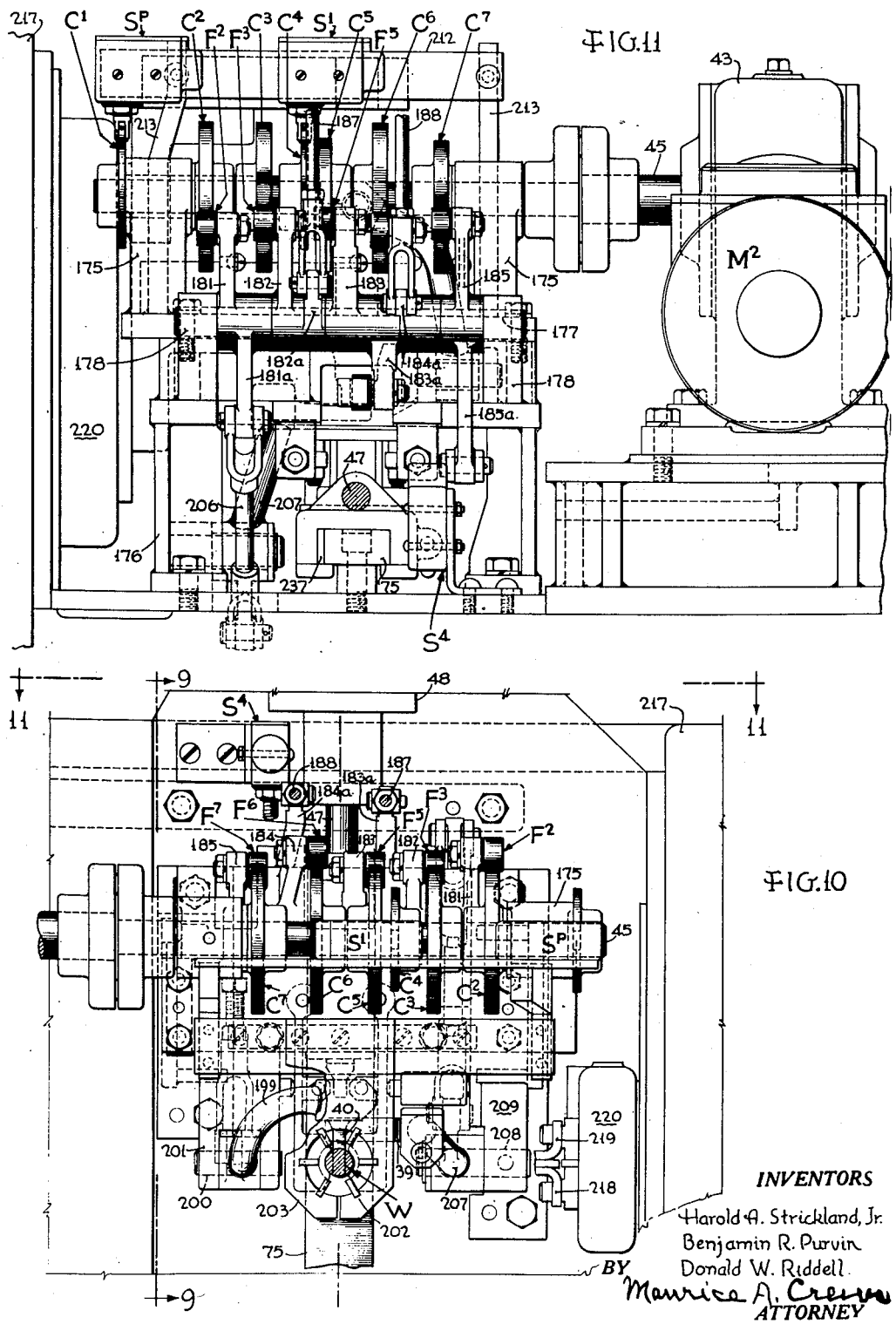

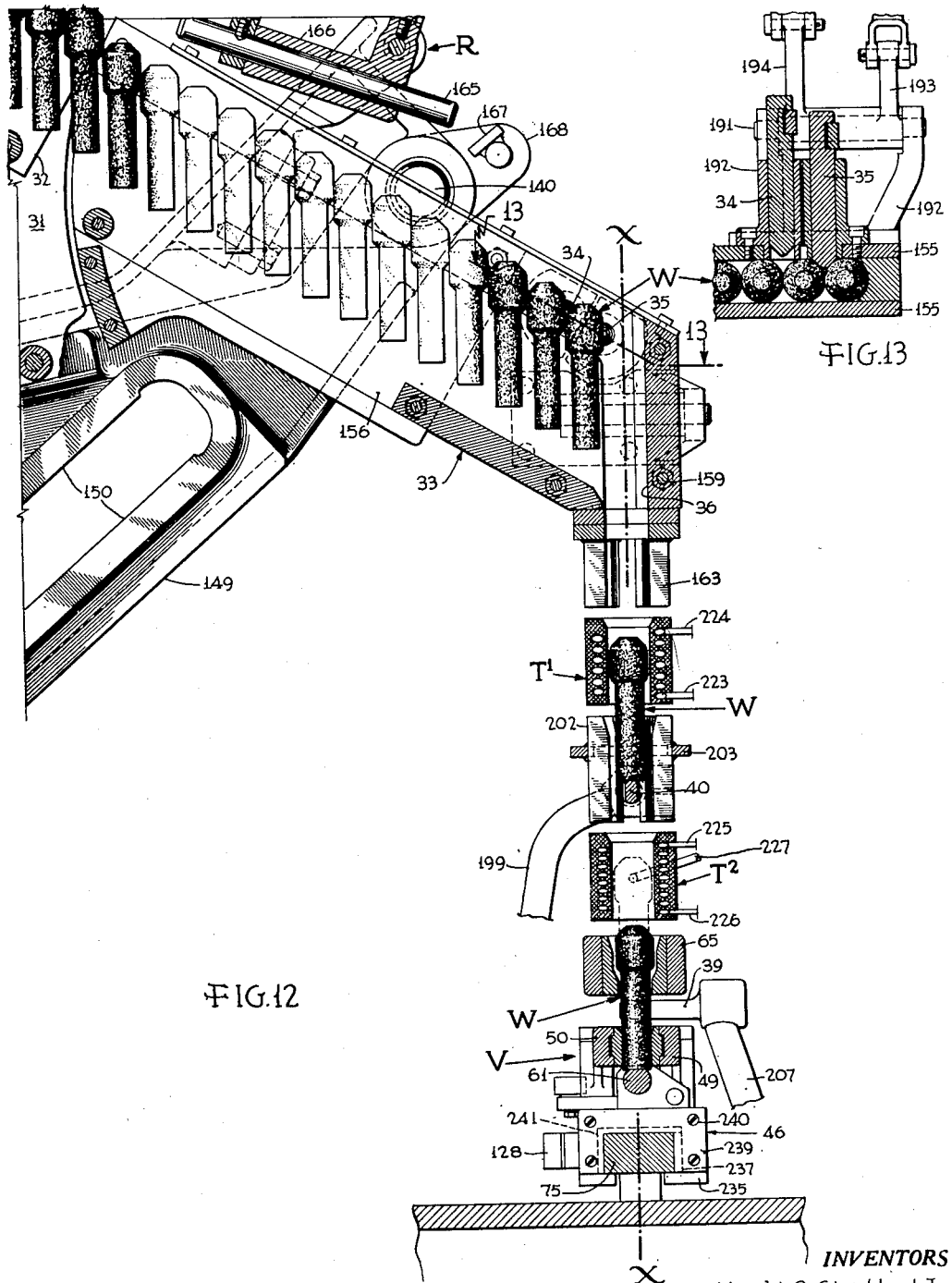

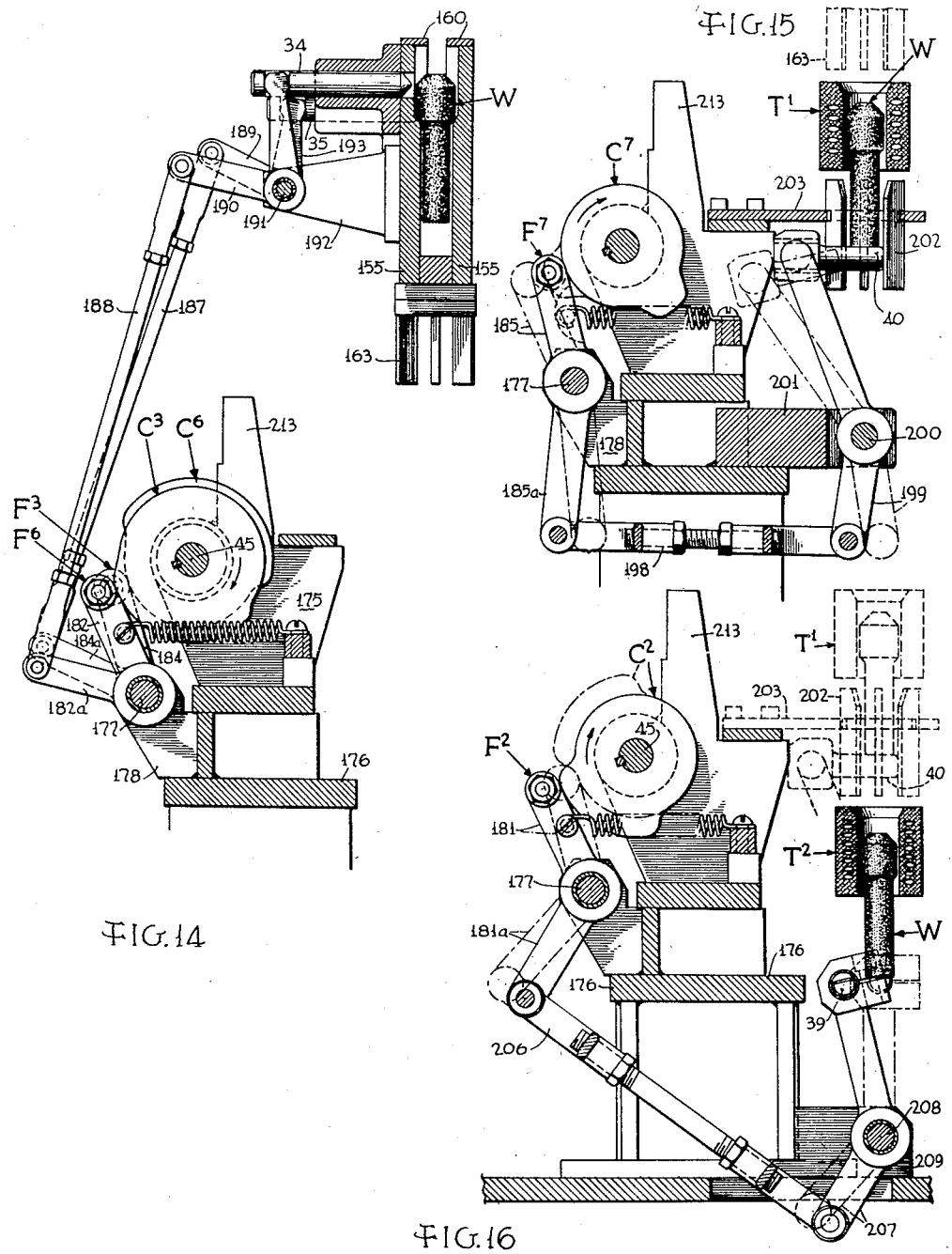

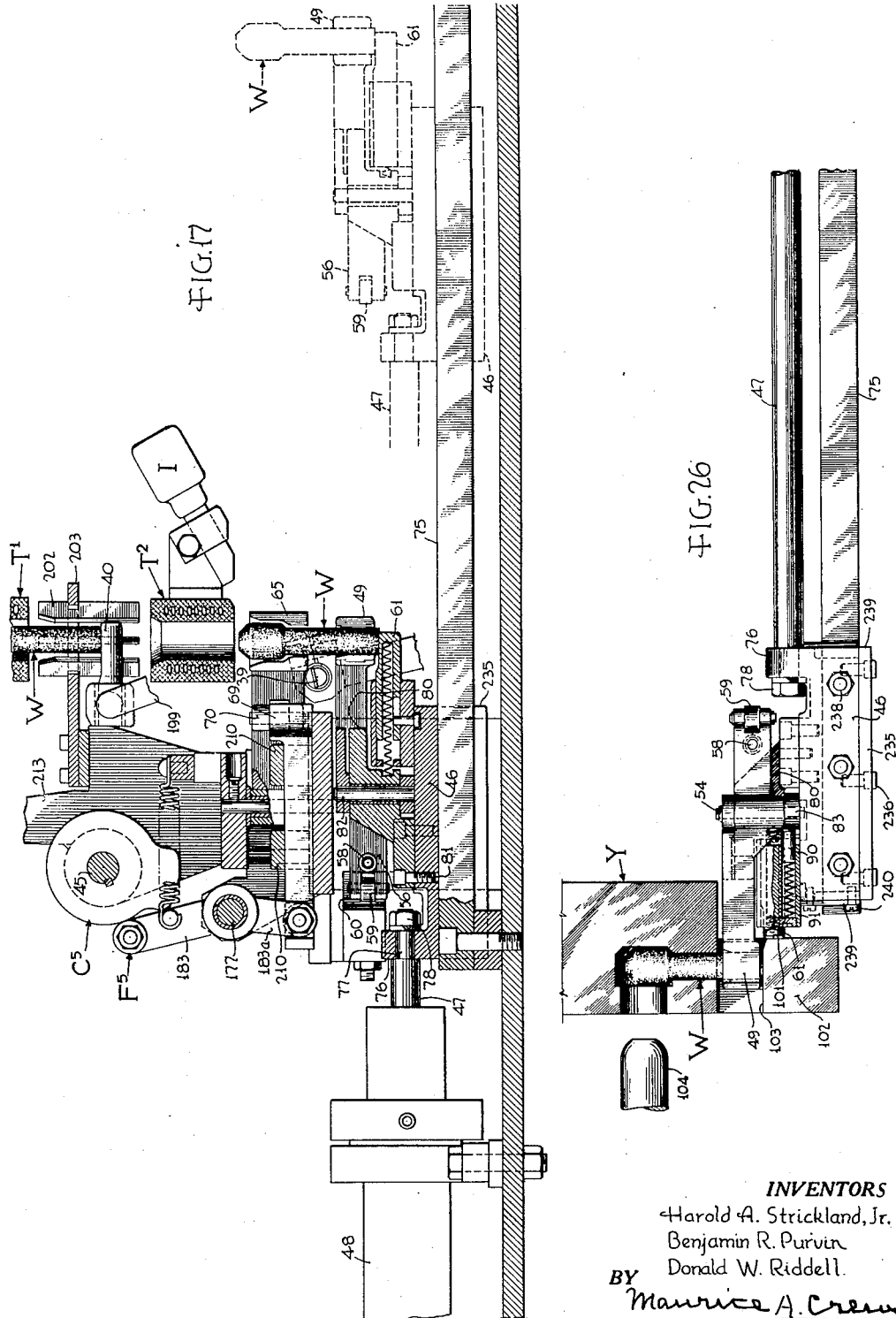

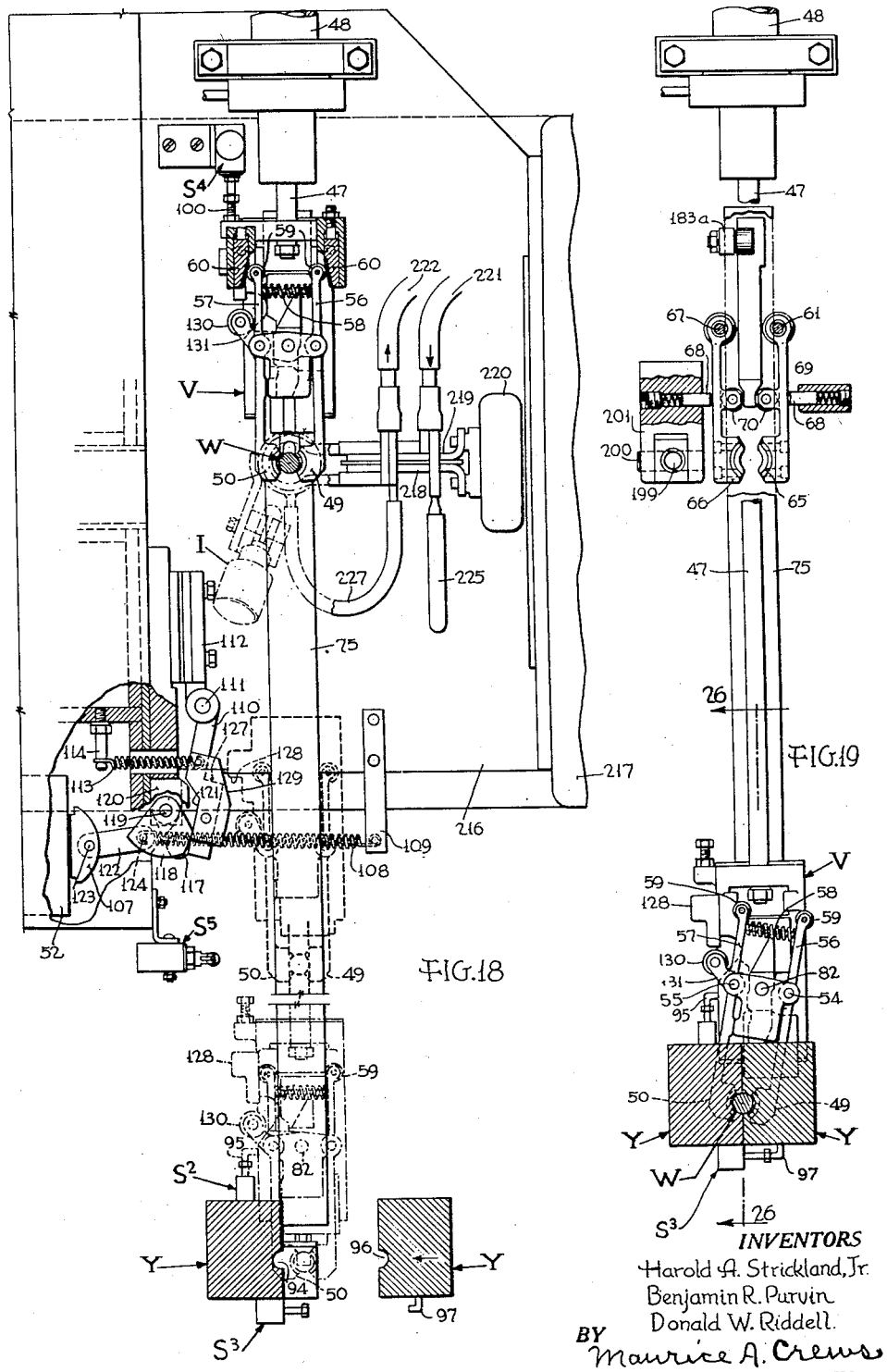

Jan. 10, 1950  H. A. STRICKLAND, JR., ET AL  2,493,785
ARTICLE HEATING AND DELIVERY APPARATUS

Filed Oct. 11, 1947  16 Sheets-Sheet 12

INVENTORS
Harold A. Strickland, Jr.
Benjamin R. Purvin
BY Donald W. Riddell
Maurice A. Crews
ATTORNEY INVENTORS
Harold A. Strickland, Jr.
Benjamin R. Purvin
Donald W. Riddell
BY Maurice A. Crews
ATTORNEY

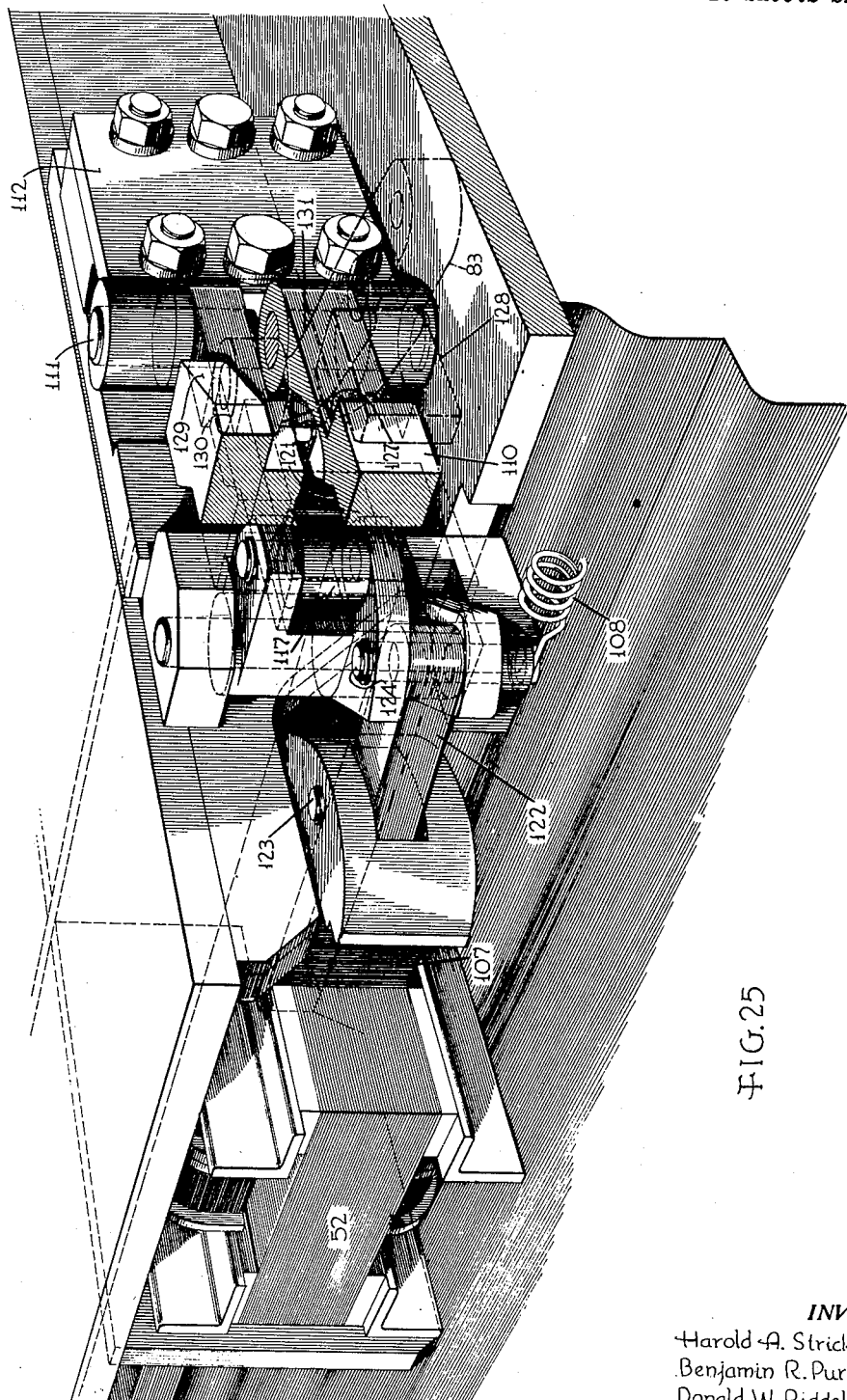

Jan. 10, 1950    H. A. STRICKLAND, JR., ET AL    2,493,785
ARTICLE HEATING AND DELIVERY APPARATUS
Filed Oct. 11, 1947                         16 Sheets—Sheet 15
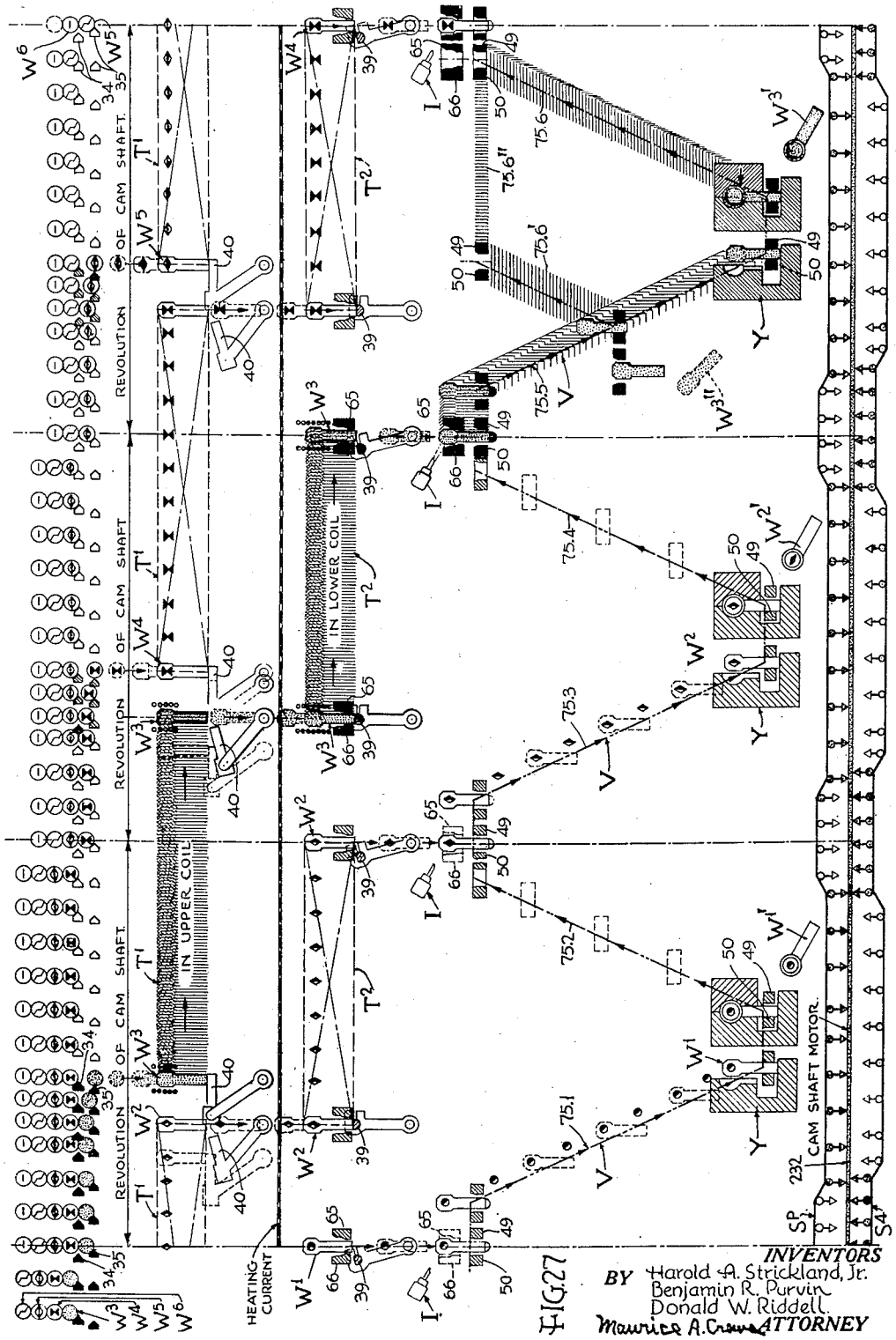
INVENTORS
BY Harold A. Strickland, Jr.
Benjamin R. Purvin
Donald W. Riddell
Maurice A. Crews ATTORNEY

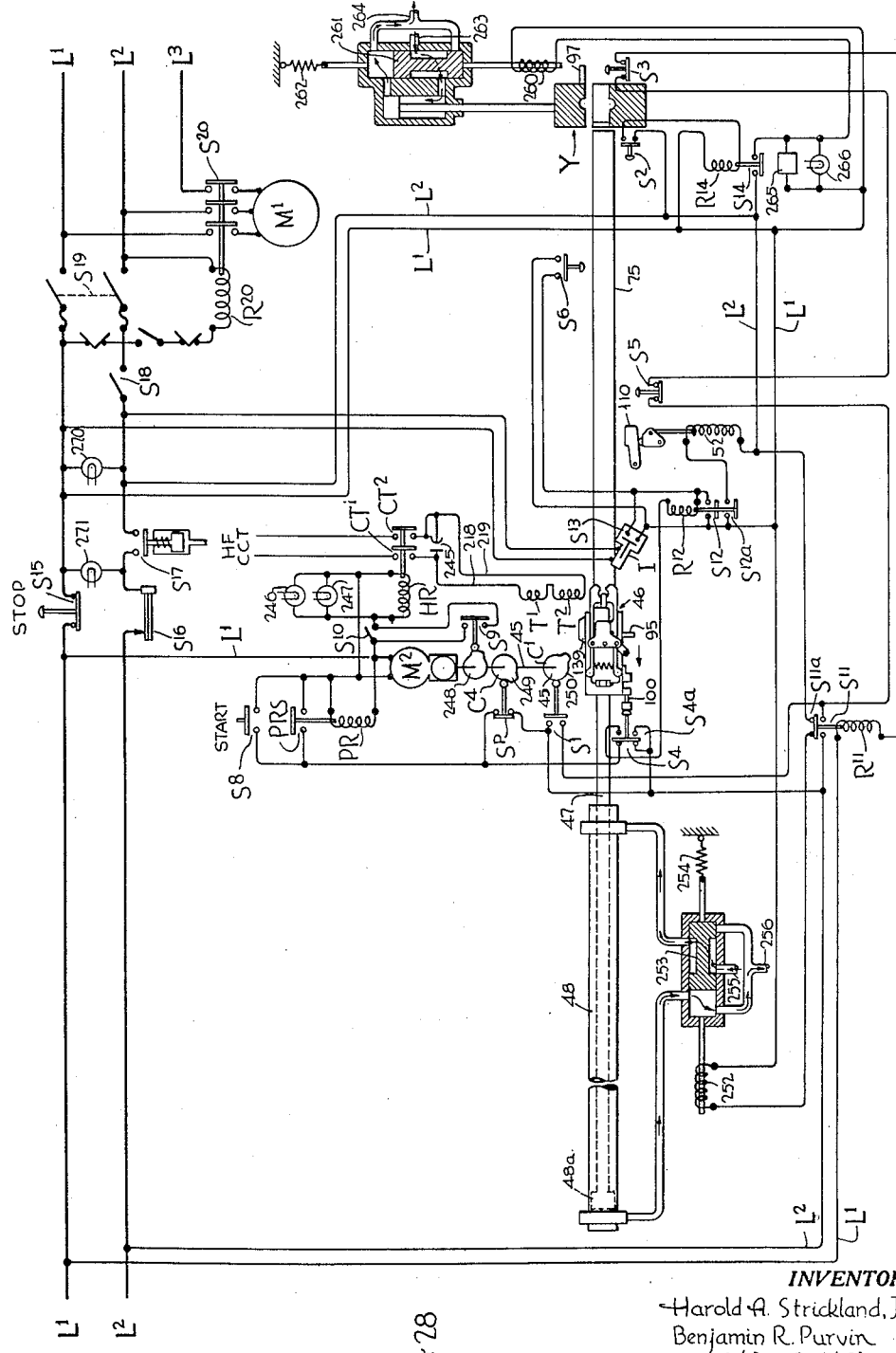

Patented Jan. 10, 1950

2,493,785

UNITED STATES PATENT OFFICE 2,493,785

ARTICLE HEATING AND DELIVERY APPARATUS

Harold A. Strickland, Jr., Grosse Pointe, and Benjamin R. Purvin and Donald W. Riddell, Detroit, Mich., assignors, by mesne assignments, to The Ohio Crankshaft Company, Cleveland, Ohio, a corporation of Ohio Application October 11, 1947, Serial No. 779,372

6 Claims. (Cl. 263—6)

This invention relates to article heating and delivery apparatus and has for an object the provisions of improvements in this art.

One of the particular objects of the invention is to feed unit articles along in an improved manner in a plurality of steps and to heat them by a plurality of heating means at a plurality of positions, thus speeding up the heating operation by heating a plurality of articles simultaneously.

Another object is to heat in an improved manner a given portion of an article at a plurality of successive stop positions or stations.

Another object is to provide improved means for feeding a properly heated article to one position for working operations and to feed an improperly heated article to another position where it is discarded.

The above and other objects and certain advantages of the invention will be apparent from the following description of an exemplary embodiment, reference being made to the accompanying drawings thereof, wherein:

Figure 6 is an enlarged rear elevation of the feeding mechanism, the view being taken on the line 6—6 of Fig. 2;

Figure 7 is a vertical section taken on the line 7—7 of Fig. 4;

Figure 8 is a horizontal section taken on the line 8—8 of Fig. 3;

Figure 9 is a vertical elevation partly in section, looking from front to rear, the view being taken on the line 9—9 of Figs. 3 and 10;

Figure 10 is a top plan view of the apparatus shown in Fig. 9;

Figure 11 is a side elevation, partly in section, of the apparatus shown in Figs. 9 and 10, the view being taken approximately on the line 11—11 of Fig. 10;

Figure 12 is an enlarged schematic vertical section taken on line 12—12 of Fig. 9;

Figure 13 is a section of a detail, the view being taken on the line 13—13 of Fig. 12;

Figure 14 is an elevational detail of the article feeding mechanism;

Figure 15 is an elevational detail of the article holding and releasing mechanism at the first heating station;

Figure 16 is an elevational detail of the article holding and releasing mechanism at the second heating station;

Figure 17 is an elevational and sectional detail of the article transfer mechanism and related parts;

Figure 18 is a plan view of the article delivery or conveying mechanism, that is, the mechanism for conveying heated articles from the heating position to the forging position;

Figure 19 is a partial plan view similar to Fig. 18 but showing the parts in different positions;

Figure 25 is a perspective view of a tripping mechanism shown in Fig. 20 for causing faulty articles to be rejected, some of the parts associated therewith being shown in phantom lines;

Figure 26 is a partial vertical section taken on the line 26—26 of Fig. 19;

Figure 27 is an operational or flow diagram; and

Figure 28 is a schematic wiring diagram.

Figure 1:
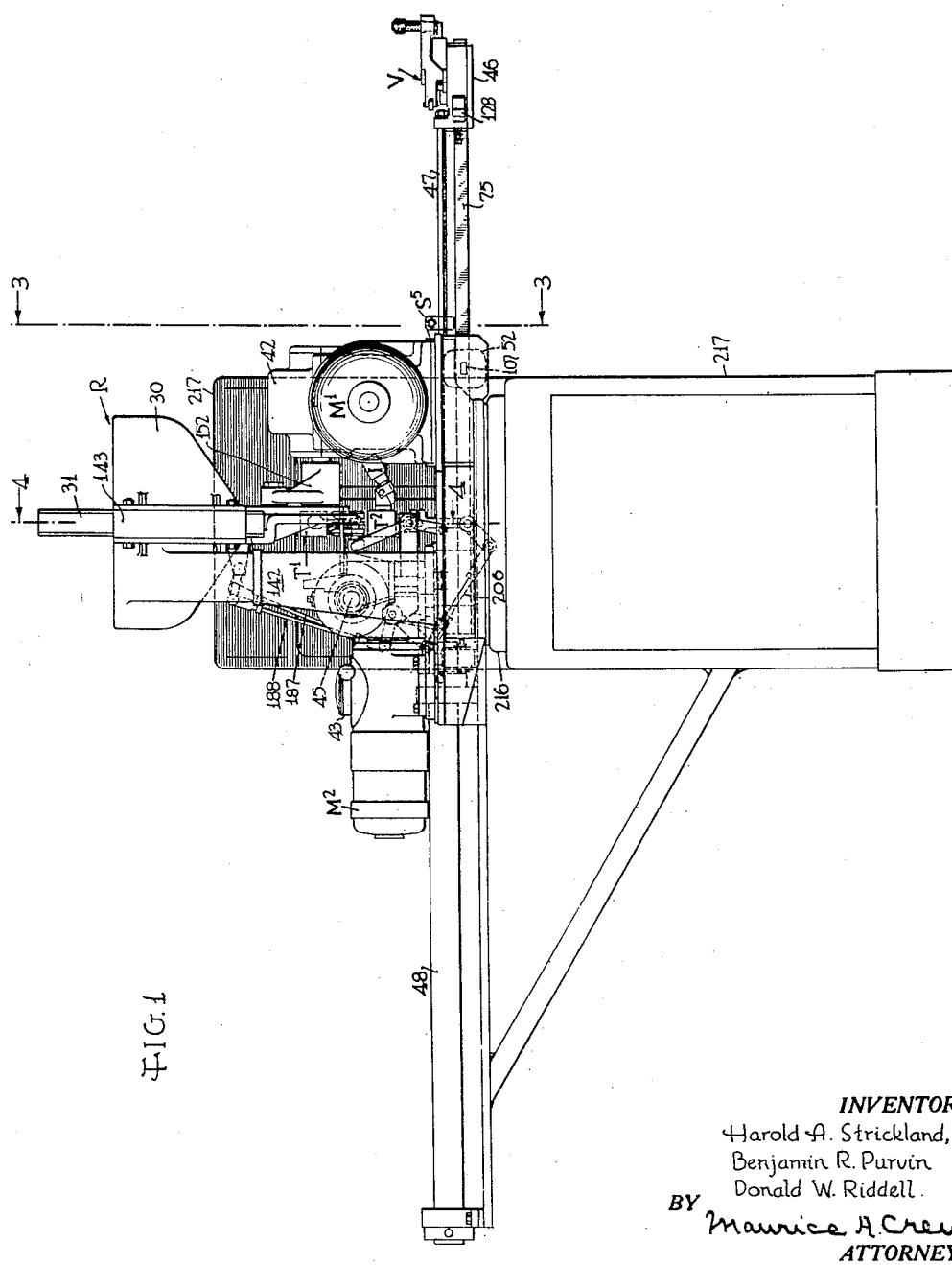
Figure 1 is a front elevation of one form of apparatus embodying the invention.

The machine herein illustrated includes (Fig. 12) an article feeding mechanism R, a vertical guideway, represented by the axis X—X, along which articles, such as headed studs W, feed by gravity, a plurality of heating devices T1, T2 at spaced points along the guideway, means for halting articles in each heating position and for releasing them after heating, and conveying means V for taking the heated articles from below the last heating position and moving them (Fig. 18) to a position where they will be processed if they are properly heated, as by the dies Y of a forging machine, or moving them (Fig. 20) to a discard position if they are not properly heated.

The machine is adapted to heat a given portion of an article, in the present case the head of a stud, and the heating is preferably performed by high frequency electrical inductors when the articles are of electromagnetic material, such as iron or steel. The heated condition of the articles may be measured by a light sensitive cell or "electric eye" and that is employed for choosing whether a properly heated article is conveyed to the forging dies or an improperly heated article is rejected and conveyed to a discard position. The electric eye is here designated by the reference character I (Fig. 9).

The apparatus illustrated is adapted to feed headed studs through succesive heating stations where their heads only are heated and to convey them after heating to a forging machine which forms a socket in the side of the head. The articles when finally finished may be the socket member of a ball and socket joint for an automobile steering gear, the example selected, however, being only for illustration and not limiting as to the scope of application of the invention. The apparatus comprises means associated with the article-delivery apparatus for discarding improperly-heated articles. The improper heating normally ocurs when the machine is first started up but the assurance of safety exists at all times thereby definitely avoiding the breakage of dies.

Without intention of limiting the scope of the invention, the general construction and mode of operation will be described in relation to the specific embodiment illustrated.

Figure 3:
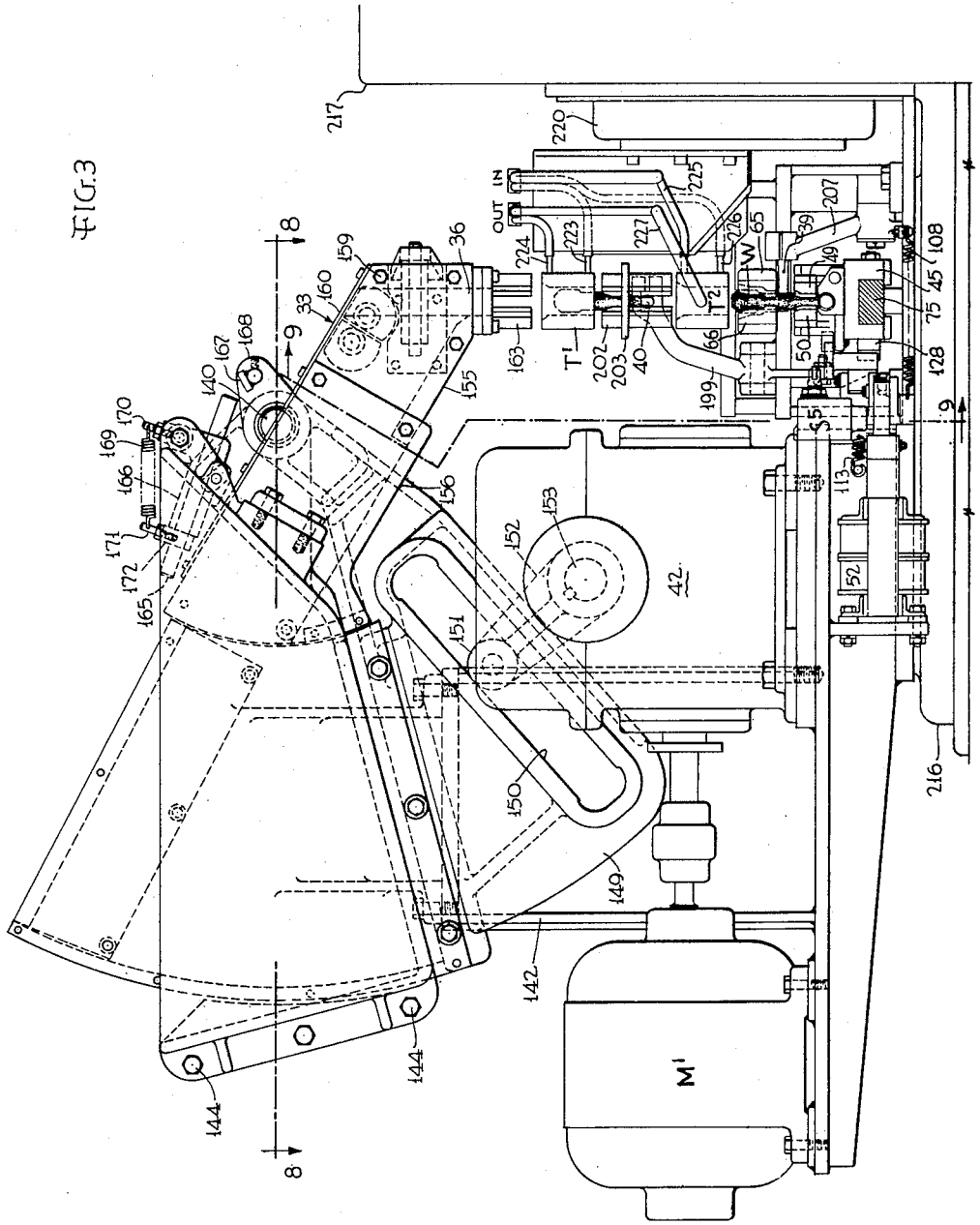
Figure 3 is an enlarged side elevation, partly in section, of a portion of the apparatus shown in Fig. 1, the view being taken on the line 3—3 on the right side of Fig. 1, but with the feed carriage in returned position.
Figure 4:
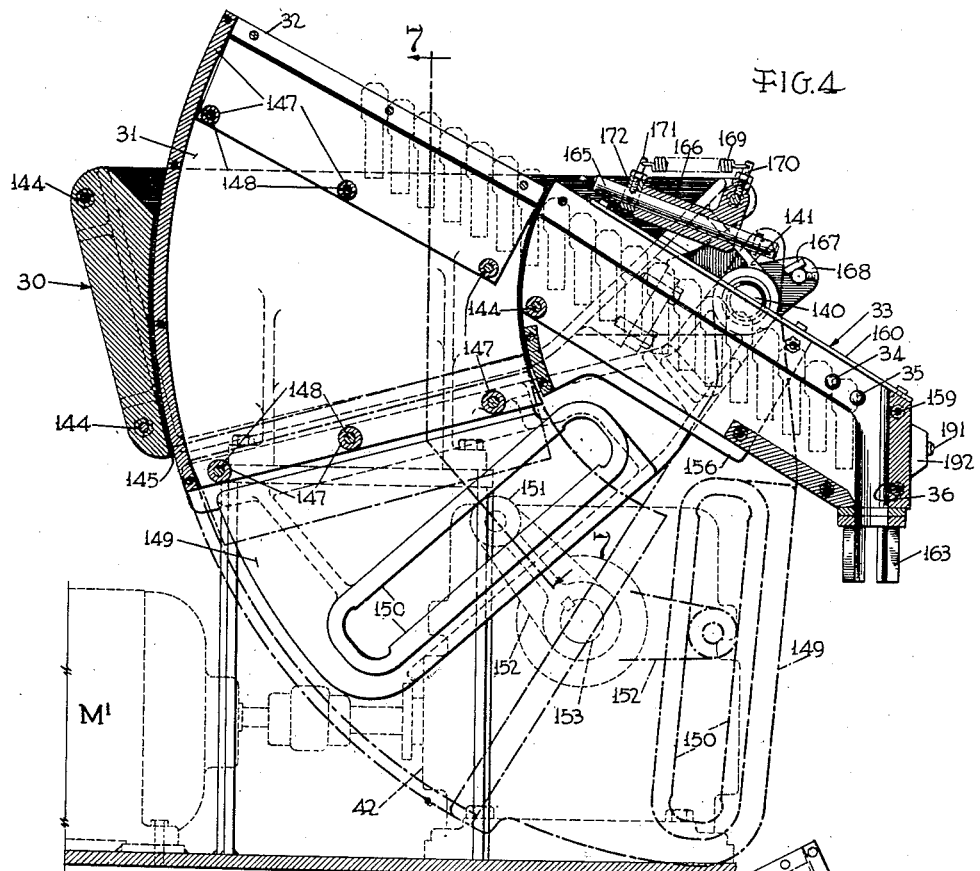
Figure 4 is a vertical section of the feeding mechanism on the scale shown in Fig. 3, the view being taken on the line 4—4 of Fig. 1.
Figure 5:
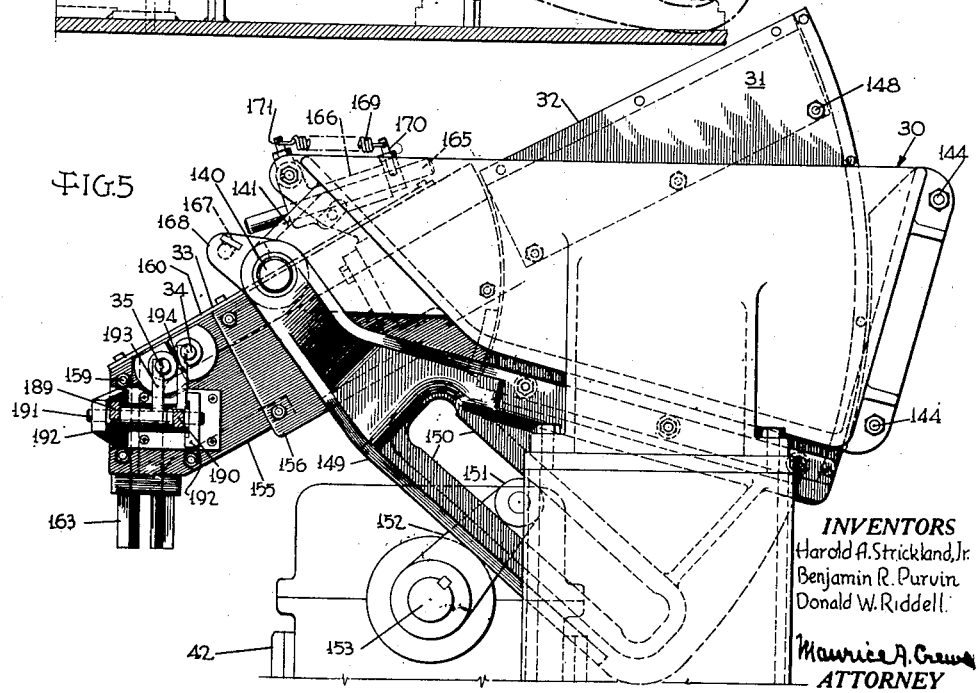
Figure 5 is a side elevation of the feeding mechanism, the view being an enlargement of a portion of the apparatus seen from the left side of Fig. 1.

Referring to Figs. 3 and 4, the workpieces in the form of headed studs, bolts or the like, are dumped into the hopper 30 of the feeding mechanism R and are picked up and aligned with their heads uppermost by an oscillating feed arm or blade 31 having a trough 32 which, in the raised position (Fig. 4), is aligned with an inclined fixed feed chute 33. Escapement plungers 34, 35 release the lowermost stud from the inclined feed chute 33 into a vertical chute 36. The oscillating feed arm is operated at such speed that the supply of studs in the inclined chute 33 is always adequate but it need not be timed with the operation of the rest of the apparatus. The escapement plungers 34, 35, however, are timed with the operation of the subsequent apparatus to feed one stud for each cycle of movement.

Referring to Fig. 12, it may now be explained that as soon as the workpiece or stud W in the lower heating coil or inductor T2 has been dropped down into the delivery or conveying means V and moved out of the way, a stop member 39 moves back into holding position across the vertical chute line X—X. Then an upper stop member 40 moves out of the vertical chute line, allowing a partly heated stud to drop down on the lower member 39. The member 40 then moves back into operating position and a stud is fed out by the escapement plungers 34, 35 into the vertical chute 36 to drop down upon the upper stop member 40.

It may here be noted that if the conveying means fails to operate properly, the feeding and heating means will be put out of action so that there will not be a pile-up of studs in the vertical chute along the heating line X—X and so no articles will be heated to a molten state. The stops 39 and 40 hold the heads of studs W accurately in heating position in the inductors T2 and T1 respectively, and except for shift periods, studs are being heated simultaneously in both the inductors.

Figure 2:
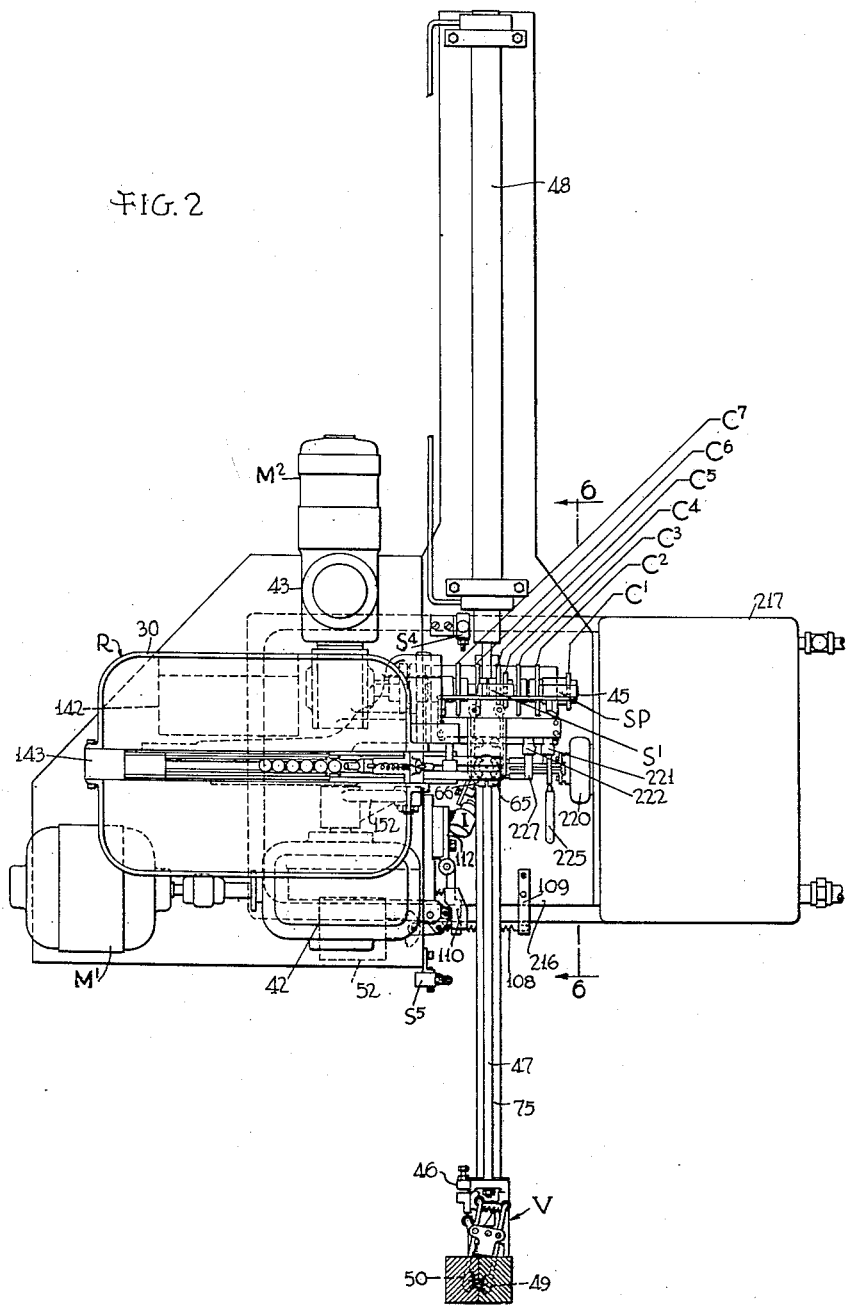
Figure 2 is a plan view of the apparatus shown in Fig. 1.

Referring to Fig. 2, the feeding arm 31 is operated by a feed motor M1 through a reduction gear device 42. The feeding mechanism may be operated continuously and without connection with the heating and transfer mechanism. The remaining mechanism is operated by a motor M2 through a "Graham" gear drive device 43 which provides selective speed adjustment. The motor M2 and the selective drive device 43 actuate a cam shaft 45 which operates certain mechanism and times the action of the remaining apparatus.

Still referring to Fig. 2, the conveying means V includes a carriage 46 attached to a piston rod 47 which is actuated by a piston (not shown) in a cylinder 48. The carriage has mounted thereon a pair of gripper feed jaws 49, 50 which grasp a stud W (Fig. 12) at the bottom of the vertical chute along the line X—X and carry it to the dies Y of a forging machine. That is, the feed jaws will take the stud to the forging dies if its head has been properly heated; but if the head has not been properly heated, the carriage and jaws are intercepted by discard or rejecting mechanism located alongside their path of travel and are caused to discard the stud instead of conveying it to the forging dies. The rejecting mechanism is omitted from Fig. 2 for clarity but it is shown in detail in Figs. 18 to 25. It is controlled by an electric eye I, Figs. 17 and 20, which is directed at the stud head in its dropped position on the carriage. If the stud is properly heated, the electric eye energizes a solenoid 52 which causes certain tripping mechanism to be withdrawn from the path of the carriage and jaws, but if the stud has not been properly heated, the electric eye will not energize the tripper-withdrawing solenoid and the tripping mechanism will intercept the carriage and jaws to cause the stud to be moved to one side and dropped, as into a scrap can or chute (not shown).

As shown in Figs. 17, 18, 19, and 26 the feed jaws 49, 50 are pivoted at 54, 55 respectively, and have rearwardly extending arms 56, 57 which are urged apart by a spring 58. The arms 56, 57 carry cam rollers 59 which in the rearward position of the carriage 46, engage spaced rigid but adjustable cams 60 which spread the jaws apart slightly to allow the stem of a stud to drop down between them. Immediately below the feed jaws, there is disposed a stop plunger 61 which is normally pushed out as far as its stops permit by a spring 62 and this plunger underlies the lower end of a stud when it drops down.

Beneath the lower inductor T2 and above the feed jaws when in rearward stud-receiving position, there is disposed a pair of stud-positioning guides 65, 66 which are pivoted on fixed journal pins 67 and are urged toward each other by spring-pressed plungers 68. At the proper time the guides 65, 66 are spread apart to allow a stud to be moved out from between them, the spreading of the guides being effected by a wedge cam plunger 69 which is pushed between spaced cam rollers 70 on the sides of the guides.

Means are provided for opening the feed jaws 49, 50 when they are in die-feeding position and also when they are in the stud-discarding position, but before explaining this, it will be helpful to understand something more of the carriage mechanism.

As shown in Figs. 1 and 2, the carriage slides along a guide bar 75 which, as shown in Fig. 12, is of rectangular shape to prevent turning movement of the carriage. As shown in Fig. 17, the carriage 46 is provided with an upstanding projection 76 through which a reduced end 77 of the piston rod 47 passes, the rod being secured to the projection by a nut 78 and a cooperating lock washer. An upstanding overhanging support 80 is secured to the carriage, as by cap screws 81, and in this support 80 there is mounted a vertical journal pin 82.

Figure 20:
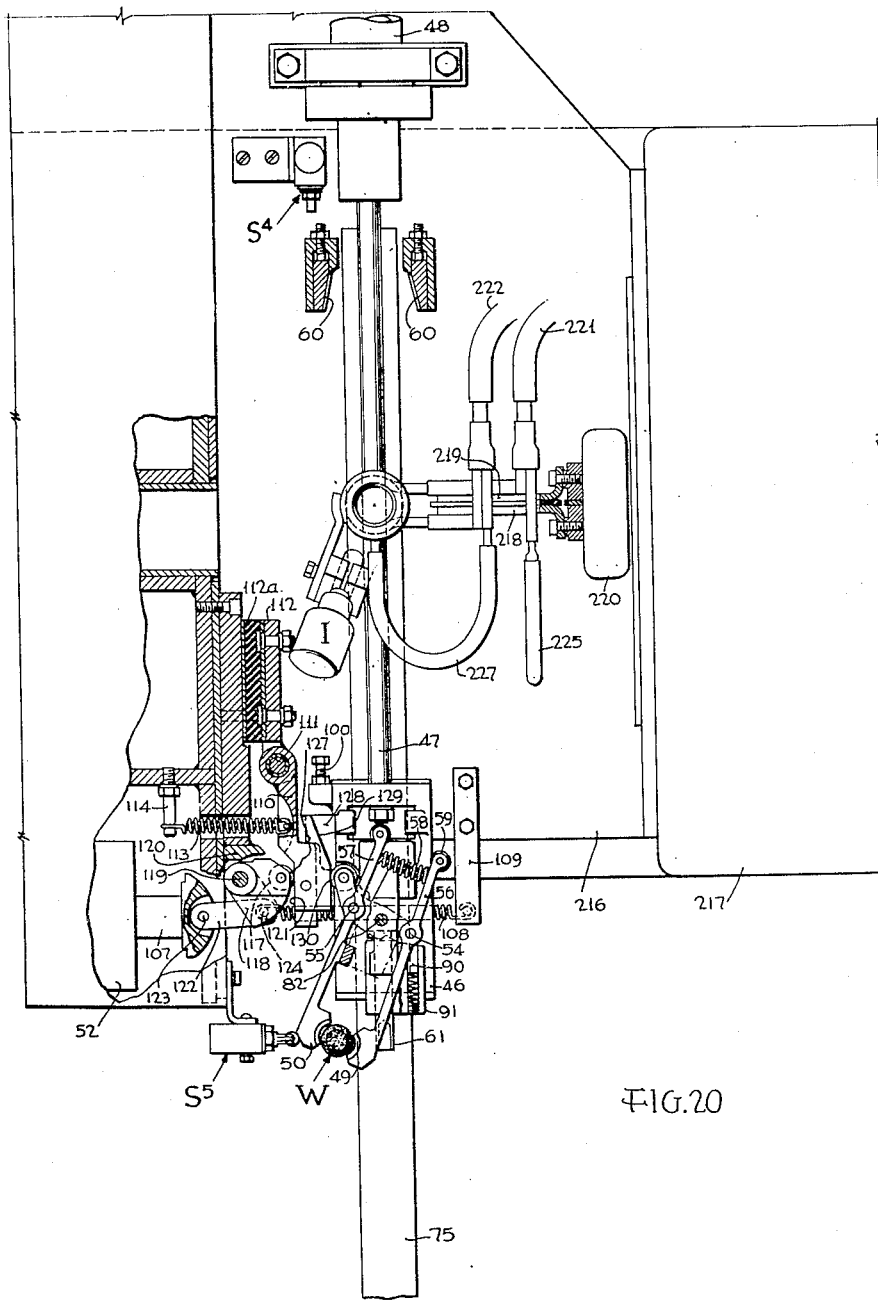
Figure 20 is a plan view similar to Figs. 18 and 19 but showing the parts in an article-rejecting position.
Figure 21:
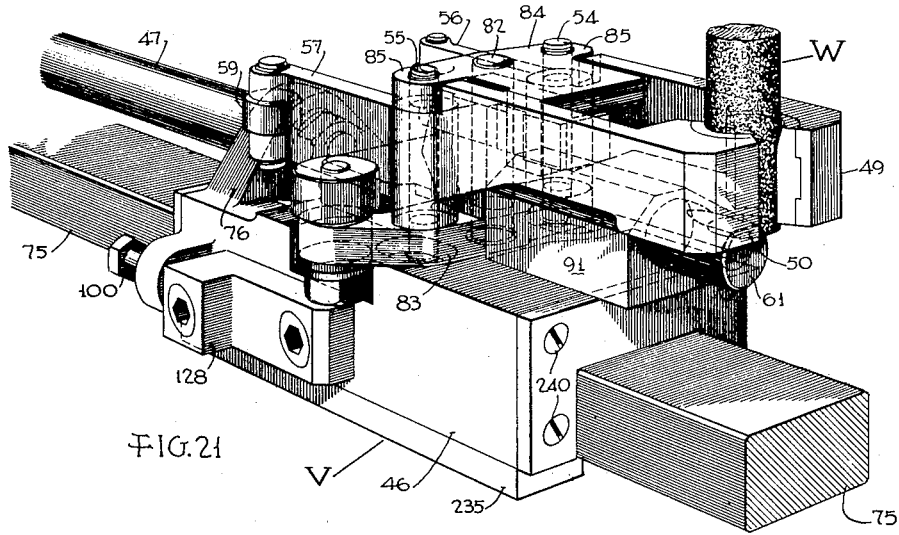
Figure 21 is a side and end perspective view of the article-conveying device.
Figure 22:
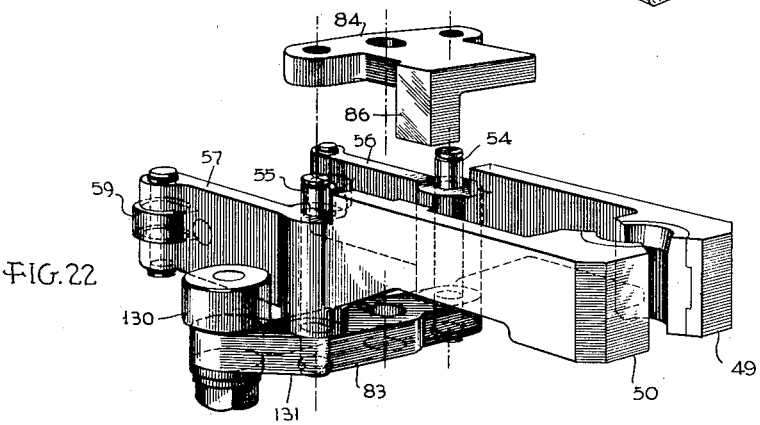
Figure 22 is a partly exploded perspective view of parts shown in Fig. 21.
Figure 23:
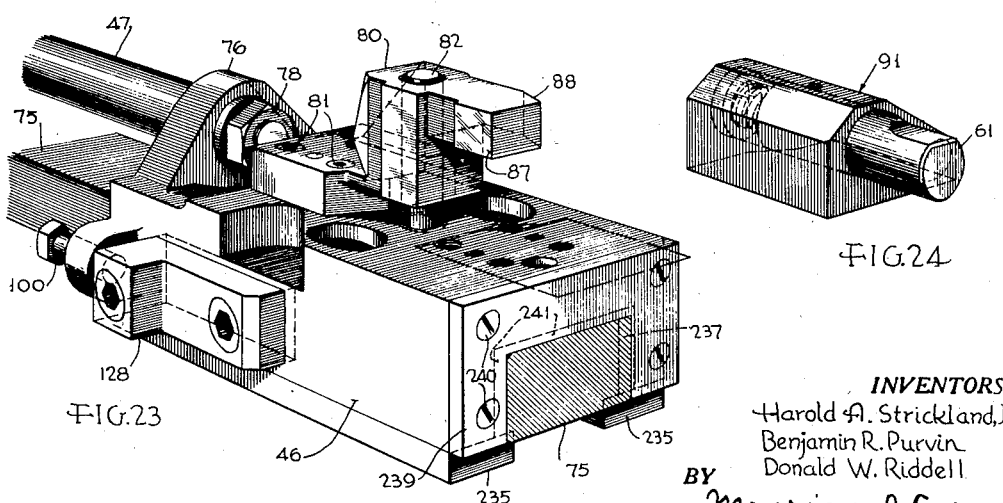
Figure 23 is a perspective view of some of the parts shown in the lower portion of Fig. 21.
Figure 24:
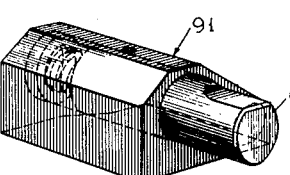
Figure 24 is a perspective view of an article-supporting member shown in Fig. 21.

As seen in Figs. 21 and 22, a laterally swingable jaw mount is turnably mounted on the pin 82, the mount comprising a lower plate 83, located beneath the overhanging support 80 and an upper plate 84, located above the support, the pivot pin 82 extending through the plates 83 and 84. The pivot pins 54, 55 of the jaws connect the plates 83, 84, suitable locking rings 85 fitting in annular grooves in the pins to hold the parts together. The upper plate 84 has a side lug or stop 86 against which the side of the jaw 50 engages to limit its inward position. The support 80 has a side lug or stop 87 against which the side of the jaw 50 engages to limit its inward position. The support 80 also has a side stop 88 against which the side of the jaw 49 engages to limit its sidewise movement in stud-discarding position, as shown in Fig. 20. Still referring to Fig. 20 and also to Fig. 26, a spring-pressed jaw-mount return plunger 90 is shown to be mounted in a bore in a block 91 which is bolted upon the carriage 46, the same block mounting the stop plunger 61 previously described. The block 91 is shown more clearly in Fig. 21 and is separately illustrated in Fig. 24. The plunger 90 engages the lower plate 83 on one side of its pivot center on pin 82 and urges it back to a central position.

Now it may be observed that since the plunger 90 urges the plate 83 of the jaw mount to central position and since the upper plate 84 of the mount presses the jaw 49 sidewise through its stop 88, and further, since sidewise pressure on jaw 49 is transmitted to the other jaw 50 through the mutual coil spring 58, the final result is to force jaw 50 against the fixed stop 87 of the support 80. This brings the parts back to central position with the jaws ready to receive a heated stud on the line X—X when the carriage moves back.

The normal operation of the carriage 46 and feed jaws 49, 50 may now be clearly followed by reference to Figs 18 and 19. The jaws are spread apart slightly by cams 60 when the carriage is in its rearmost position and a workpiece or stud W drops down between the jaws 49, 50 and comes to rest on the stop plunger 61 when the stop pin 39 is withdrawn from the line X—X. The positioning guides 65, 66 direct the stud into the jaws 49, 50 and hold it in upright position. Timed cam means, later to be described, now operates a switch S1 (Fig. 9) which causes motive fluid to be supplied to the head end of power cylinder 48 and to exhaust fluid from the rod end of the cylinder to push out the rod 47 and move the carriage V and jaws 49, 50 to the forging dies Y. At about the time the jaws 49, 50 are ready to move out the wedge cam plunger 69 opens the guides 65, 66 to allow the stud to be moved out from between them. As soon as the jaws 49, 50 begin to move, their rollers 59 leave the cams 60 and the jaws grip the shank of the stud which they carry.

When the stud reaches the forging dies Y it is disposed on its own center line of movement but at one side of the vertical axis of the arcuate cavity 94 of a fixed die Y. A switch actuator 95 on the carriage actuates a switch S2 to cause a movable element of dies Y to move toward the fixed die element and by its cavity 96 carry the stem of the stud into the cavity 94 of the fixed die element. The jaws 49, 50 are below the forming portions of the dies so no obstruction exists. As shown in Fig. 19, the movement of the stud by the movable die element forces the jaws 49, 50 sidewise as much as required. When the carriage is moved back, the jaws yield to pull off the stud which by this time has been firmly engaged by the dies Y. Actuation of a switch S3 by the cam 97 of the movable die element causes the carriage to be moved back by causing motive fluid to be supplied to the rod end of the cylinder and spent fluid to be exhausted from the head end.

On the return stroke of the carriage and just before it engages its end stop, an adjustable stud 100 carried on the rear end of the carriage actuates a safety switch S4 which assures continued operation of the machine. If switch S4 is not actuated when a certain cam shaft actuated switch is opened, the entire feeding, heating and conveying apparatus is shut down. The proper return of the carriage is thus made a condition precedent to the continued operation of the apparatus and no stud is fed down to interfere with the movement of the carriage when it does return.

As shown in Fig. 26, when the carriage 46 reaches the outer end of its stroke, the stud-supporting plunger 61 strikes a stop 101 on a part 102 of the forging dies Y and is pushed back against its spring, the jaws 49, 50 meantime pushing the workpiece or stud W upon a horizontal surface 103 of part 102 to place it in exactly correct vertical position in the dies. The surface 103 at its front edge is bevelled slightly to avoid obstruction to the movement of the stud. A side-acting plunger 104 enters an opening between the main dies and forms a side-opening socket in the hot head of the stud, in this action causing the metal of the stud head to flow and fill the die cavity.

So far, it has been assumed that the stud heads were properly heated and that the carriage moved to the forging dies and returned in normal fashion, the electric eye I causing the solenoid 52 to be energized to withdraw the trip mechanism from the path of the carriage so it could move without interruption to the dies. The mechanism and method of operation by which an improperly heated stud is discarded will now be described Referring to Fig. 18, it may be seen that when the solenoid 52 is energized, it retracts its plunger 107 against a spring 108 which is attached at its outer end to a fixed anchorage 109. A gate or tripper 110 is swingably mounted on a journal pin 111 carried by a fixed bracket 112, the tripper being urged away from tripping position by a spring 113 which is much lighter than spring 108. The outer end of spring 113 is secured to a fixed stud 114.

The tripper 110 is pushed out into tripping position by a cam roller 117 carried by a sector 118 which is pivoted on a journal pin 119 carried by a fixed bracket 120, the cam roller 117 acting against a cam surface 121 on a part of the tripper 110. A link 122 operatively connects the sector 118 to the solenoid plunger 107, pivot pins 123 and 124 connecting the link to the plunger and sector respectively. The spring 108 at its inner end is attached to the pin 124.

The tripper has two surfaces which are adapted to cooperate with parts on the carriage, one being an abrupt stop surface 127 which is adapted to be engaged by a stop member 128 secured to the side of the carriage and the other being a cam surface 129 which is adapted to be engaged by a cam roller 130 on a cam arm 131 of the lower plate 83 of the jaw mount.

As shown in Fig. 20, when the abrupt surface 127 of the tripper is engaged by the stop member 128, the outward movement of the carriage is halted against the yielding pressure of motive fluid in the power cylinder 48. The bracket plate 112 is mounted on a resilient pad 112a to yield slightly also to ease shock. Shortly before the carriage is stopped, the cam roller 130 rides up on the cam surface 131 to swing the jaw mount around its journal pin 82 to carry both jaws to one side. The jaw 49 is halted by the fixed stop 88 but the other jaw 50 is moved out further yet by the side lug 86 of the upper mount plate 84 and is thus separated from the jaw 49 to allow the stud W to fall clear of the jaws.

The jaw 50 actuates a switch S5 which has a function similar to that of switch S3, previously described, and causes the carriage to be returned to its rearward position. During this movement the plunger 90 causes the jaw mount and jaws to return to central position, as previously described.

When the solenoid 52 is energized by the electric eye I, its plunger 107 is held out by any suitable means such, for example, as relay lock means in the circuit later to be described. Actuation of the switch S4 when the carriage reaches the rear end of its stroke releases the relay and the solenoid 52. Thus it is provided that the tripping mechanism, once it is pulled clear by the electric eye, is kept clear for the full trip of the carriage to the dies Y and return.

Other means may be provided to give further assurance that the tripping device is clear of the path of the carriage when it returns, in case the solenoid 52 may have been accidentally released. This means may comprise a switch S6 and cam 139 operated by the carriage to cause the solenoid plunger to withdraw or may be camming means between the carriage and tripping device to throw the latter out of the way. The cam shown for operating the switch may be considered to be also the type used if it actuates the tripping device directly.

Having now followed the workpieces through the machine and having noted the details of apparatus which intimately concerned their treatment, it will be helpful to understand the details of the apparatus which produces the operation, as well as of that which forms mechanical support for the active parts.

As shown in Fig. 3, the oscillating stud-feed arm 31 is pivoted upon a journal pin 140, which journal pin, as shown in Figs. 6 and 8, is mounted in a bracket 141 secured to one side of the hopper 30. The hopper is supported by a pedestal 142 which is also secured to the side on which the arm 31 is hinged. The hopper 30 consists of two parts, as shown in Fig. 8, and these parts are spaced apart by the chute 33, previously noted, and a spacer 143. Bolts 144 hold the parts of the hopper together. The spacing between the parts of the hopper is such as to leave an opening 145 at the bottom in which the arm or blade 31 operates.

The arm or blade 31, as shown in Figs. 4, 7 and 8, comprises two spaced sector-shaped plates 146 which are held in proper position by spacers 147 and bolts 148. The plates are sufficiently wide to keep the hopper opening closed on the sides at all times so that the movable trough 32 can move down to the bottom of the hopper without obstruction and pick up and align studs as it moves back up. The plates are attached at the bottom to the body piece 149 of the arm, the part which is journaled on the pin 140, and this body piece is provided with a cam slot 150 within which moves a cylindrical or roller cam 151 carried by a cam arm 152 supported by the rotatable cam shaft 153 of the speed reduction gear 42 previously described. The upper position of the feed arm or blade is shown in Fig. 4 in full lines and the lower position in dotted lines. The motor M1 and feed arm are allowed to operate continuously except when the machine is completely shut down because it cannot feed too many studs and its continued operation can do no harm.

The feed chute 33 comprises spaced members 155, Fig. 8, which are carried between spaced plates 156 which are secured to the hopper 30 by bolts 157. Spacers 158 and bolts 159 hold the parts together. Cover members 160, held by bolts 161, keep the studs from getting out of proper feeding position. Bolts 162 secure the chute members 155 to the plates 156.

A stud guide 163, comprising a support ring and a plurality of downwardly extending fingers, is secured to the bottom of the vertical chute 36. The vertical chute is formed as an extension of the inclined chute 33.

Means are provided for pushing back into the hopper any improperly disposed studs which may be left on the upper end of the chute 33. This means here comprises a pusher rod 165 which is slidably mounted in a guide piece 166. The rod is pushed out by a tappet 167 secured to an arm 168 carried by the feed arm 31 and turnable about the journal pin 140. The rod is returned by a spring 169 attached at one end to a fixed stud 170 and at the other end to a set screw 171 of a collar 172 which is adjustably secured to the rod 165 by the same set screw 171.

The cam shaft 45 is shown in Figs. 9, 10 and 11 to be mounted in bearing brackets 175 carried by a base frame 176. Adjacent the shaft 45 and parallel therewith, a rocker shaft 177 is mounted on brackets 178 secured to the base frame 176. On the cam shaft 45 there are mounted a plurality of cams C1, C2, C3, C4, C5, C6 and C7. Cams C1 and C4 operate switches SP and S1 respectively. Cams C2, C3, C5, C6 and C7 respectively, operate cam followers F2, F3, F5, F6 and F7 mounted respectively on cam rock arms 181, 182, 183, 184 and 185 which are oscillatably mounted on the rocker shaft 177. The cam rock arms are integral with hubs journaled on the rocker shaft and each has associated with it a rock arm, designated by the same number with the suffix a, so that the hub and the two arms of each set constitute in effect a lever for producing operation of some part from its associated cam. Springs urge the cam rock arms toward their respective cams.

As shown in Figs. 9–11 and Figs. 6, 13 and 14, the cams C3, C6, followers F3, F6, arms 182, 182a and 184, 184a operate rods 187, 188 respectively, which at their upper ends are connected respectively to arms 189, 190 which are journaled on a plunger shaft 191 carried on brackets 192 secured to the side of one of the chute members 155. The arms 189, 190 are rigid respectively, through their hubs with arms 193, 194 which operate the escapement plungers 35 and 34 respectively. By reference to Fig. 14, it will be seen that the cams C3 and C6 have their rise and fall on opposite sides of the shaft to produce alternate in-and-out movement of the escapement plungers 34 and 35, as required to feed down studs one at a time.

Referring to Fig. 15, it is seen that rock arm 185a, which is moved with arm 185 by cam C7, is connected to an adjustable link 198 which at its other end is pivoted to a rock lever 199. The lever 199 is pivoted by a pin 200 to a bracket 201 and at its upper end carries the stop member 40, previously described.

A grid guide 202 is provided at this point, which is just below the first heating inductor T1, the guide being supported by a bracket 203. It will be noted that the cam C7 has a short rise which pulls the stop pin 40 out and allows a stud to fall and returns the stop pin before the rise of cam C5, Fig. 14, removes the escapement plunger 35 to allow a stud to fall down upon the stop pin 40.

Referring to Fig. 16, the rock arm 181a and cam rock arm 181, associated with cam C2, are shown as having been moved by the cam. Arm 181a has pivotally connected thereto, an adjustable link 206 and the other end of the link is pivotally connected to the lower end of a lever 207 which is rockably mounted on a journal pin 208. The upper end of the lever carries the lower stop pin 39 which is disposed below the lower heating coil T2 and guide elements 65, 66. The pin 208 is mounted on a bracket 209 secured to the frame. The cam C2 holds the pin 39 out for a time sufficient to permit the stud to drop and to be removed by the carriage and returns the pin to stud-holding position just before the cam C7 (Fig. 15) operates to drop down another stud.

Referring to Fig. 17, the arm 183a which is rigid with arm 183 operated by the cam C5, has pivotally connected thereto the wedge cam plunger 69, the pivot connection having a slotted hole for the pin to provide the necessary movements. The wedge plunger slides in guides 210. By comparing Figs. 16 and 17, it will be seen that cam C5 causes the guide elements 65, 66 to hold the stud W for a short time after it is dropped down by removal of pin 39 by operation of cam C2 to allow time for the electric eye I to be energized. Then the guide elements 65, 66 release the stud to the feed jaws 49, 50 which take it away before the pin 39 is moved back to stud-holding position.

As shown in Figs. 10 and 11, the cam C1 operates a power or cycle switch SP for supplying current to the drive motor M2 and inductors T1 and T2. It is not necessary to show the shape of the cam, it being only necessary to know that it has only a single short rise (or drop) and cuts off the current only at the end of a cam shaft revolution when the carriage is supposed to be in its rear position and to have actuated S4.

The switch S1 is actuated by cam C4 to supply motive fluid to the head end of the cylinder 48 while the carriage is in retracted position and after a stud has been dropped down into the jaws 49, 50. If the switch S4 has not been closed by the full return of the carriage, the mechanism is stopped and switch S1 is not actuated. Actuation of cam C4 keeps valve means in position to supply power to the head end of the cylinder until the carriage has moved out to the permissible end of its stroke, either to carry a stud to the dies or to discard it, and until either switch S3 or S5 has been actuated to supply motive fluid to the rod end of the cylinder to return the carriage.

The switches S1 and SP are mounted above the cams upon a bar 212, supported by brackets 213.

It may here be noted (Figs. 1 and 2) that the operating apparatus, thus far described, is mounted on the shelf or pan 216 of a high frequency heat treating machine 217, such as described in the patent to Strickland No. 2,408,350. However, the furnace there shown on the machine is replaced by the heating and conveying apparatus herein described. The L-shaped housing referred to as the heat treating machine contains the transformers, condensers, buses and other electrical equipment required to deliver current to the inductors T1, T2 herein described.

As shown in Fig. 12, the inductors T1, T2 are formed as coils, the upper inductor T1 having fewer turns than the lower T2, and using more current to produce a greater heating effect than T2. As shown in Figs. 18 and 20, buses 218, 219 supply current to the inductors, the buses being insulated from each other and mounted by the support 220 on the upper front part of the housing 217. As shown in Figs. 3, 12 and 18, both the inductors and the buses are fluid-cooled, the cooling fluid being supplied by a conduit 221 and being removed by a conduit 222. Tube 223 supplies the upper heating coil T1 while a tube 224 removes fluid from it. Tubes 225, 226 supply fluid to the ends of the lower heating coil T2 while a central tube 227 removes fluid from the central part of the coil.

Figure 27 diagrammatically shows the progress of workpieces or studs W through the machine. On this diagram, the ordinates from top to bottom generally represent the distance movement of articles while the abscissae from left to right generally represent time.

The first stud observed is W1 at the left side of the diagram which drops from the stop pin 39 through the guide elements 65, 66 past the electric eye I into the feed jaws 49, 50, which feed jaws, as indicated by the line 75.1 carry the stud to the dies Y which reshape the head and then have the stud removed from them, as shown at W1'. The carriage then returns to rear position ready to receive another stud, as indicated by the line 75.2.

The next stud which is encountered is W2 which has been heated by the upper inductor T1 and has been dropped down by the upper stop pin 40 upon the lower stop pin 39. This stud W2 now is heated in the lower inductor T2 for a period which is indicated within the dotted line enclosure, identified as T2. After this heating period, stud W2 is dropped by the stop pin 39 past the electric eye I and the guide elements 65, 66 into the feed jaws 49, 50 and is, after a short time interval, conveyed to the dies Y where the head is reshaped, and the reshaped stud W2' is removed from the dies. The outward path of movement of the carriage in this case is denoted by the line 75.3 and its return by the line 75.4.

The next stud to be observed is W3, which at the beginning of the time period on which the diagram is based, is still located in the feed chute 33. The chute is not actually shown here, but each horizontally spaced vertical line of studs is designated by the reference character 33. By the operation of the escapement plungers 34, 35 the stud W3 is fed down into the upper inductor heating coil T1 and is there heated while resting upon stop pin 40 for a period which is indicated by the vertically-shaded area designated as T1. At the end of the heating period, stud W3 drops down upon the lower stop pin 39 where it undergoes a heating period T2, as indicated in vertical shade lines, and is thereafter dropped down into the carriage jaws 49, 50 and conveyed along the line 75.5 to the dies Y where it is reshaped and removed, as indicated at W3', the carriage then returning as indicated by the line 75.6. The above description refers to the normal movement of the stud if it is heated properly. However, if it is improperly heated, the electric eye will cause it to be discarded to one side of and intermediate the length of its path of travel, as indicated at W3". The carriage will then return empty, as indicated by the line 75.6', with some waiting period at one end or the other of its travel, as indicated by the short vertical shade lines 75.6".

In similar fashion, the other studs W4, W5 and W6, which are shown in the chute 33 at the upper left-hand corner of the diagram, are all moved down and all except W6 disposed of during the time interval comprehended by the diagram, so that, as indicated at the right upper corner of the diagram, the stud W5 is just ready to be released from below the stud W6 which will be retained by the escapement plunger 34.

At the bottom of the diagram, extending across the sheet from one side to the other, there is shown a cam shaft operating power line 232. The continuity of power to the motor M2 for operating the cam shaft, as previously explained, is dependent upon the operation of switches SP and S4. The contacts of these switches are indicated by arrows directed toward the power line and it is indicated that power is established when these arrows touch the power line 232. Switch S4 closes for a sufficient length of time to cause power to be applied to the cam shaft motor while switch SP is open. Switch S4 opens as soon as the carriage moves out but power may then be maintained by the renewed and continued closure of switch SP until near the end of another revolution when switch SP is opened again.

Referring to Figs. 12, 21, 23 and 26, the carriage 46 is held on the guide bar 75 by bottom retaining strips 235 held by cap bolts 236. A replaceable wear strip or gib 237 is held in adjusted position between one side of the guide bar and the inside surface of the carriage by set screws 238. Plates 239 are secured to the ends of the carriage by cap bolts 240 to retain the wear strip 237 and also wiper strips 241 of felt or the like. The bar 75 extends far into the throat of a forging press and the wiper strips prevent the entry of scale and dirt to the wearing surfaces of the carriage.

The schematic wiring diagram of Fig. 28, with but little explanation, will make clear the cycle of control and the safety features which have been incorporated in the apparatus.

The piston 48a of power cylinder 48 and carriage 46 are in rearmost position and switch operating stud 100 on the carriage has closed switch S4. Switch S4 is in parallel with switch SP between power line L2 and line L1 through power relay PR, power relay lock switch PRS, and cam drive motor M2. A start switch S8 arranged in parallel with lock switch PRS initially energizes the relay PRS. A heating relay HR is arranged in parellel with motor M2 and is energized whenever the motor is energized. Relay HR closes contactors CT1, CT2 in a high frequency heating circuit to supply current to the inductor coils T1, T2. The inductors are shown in series but they may be in parallel instead. A condenser 245 is provided in the high frequency circuit. Signal lamps 246, 247 are provided to indicate when the circuit is conditioned for "ready to heat" and "heating."

If desired, and as here shown, a heat interrupter switch S9 may be cut into the circuit of heating relay HR to provide shortened periods of heating. It is operated by a cam 248 of selected contour on cam shaft 45. This cam is not shown elsewhere. The intermittent switch S9 may be shunted out by a hand switch S10 if desired.

Assuming that the carriage is in rear position to keep the motor and heating relay PR energized during the time the cam riser 249 on cam C4 holds switch SP open, the cam shaft 45 will continue to operate and will cause a workpiece stud to be dropped down in the carriage jaws 49, 50. Still further rotation of the cam shaft will cause the cam riser 250 on cam C1 to close carriage feed-out switch S1 to cause the carriage to move out with the stud. In the meantime the electric eye I has determined whether the stud is hot enough to feed to forging position or whether it must be discarded.

Switch S1 is closed only momentarily but while it is closed it energizes transfer control relay R11 through normally closed switches S3 and S5 operated by die closure or stud discard respectively. The relay R11 locks itself in circuit through its switch S11 and at the same time opens its switch S11a to de-energize solenoid 252 and allow the four-way valve 253 (or any equivalent arrangement) controlled thereby to move out toward its spring 254. Pipe 255 supplies motive fluid to cylinder 48 and pipe 256 exhausts fluid from it. Normally solenoid 252 is energized to supply live fluid from pipe 255 to the head end of the cylinder and that is the position shown in Fig. 28. When either of the switches S3 or S5 is opened by delivery of a stud, this de-energizes relay R11 which in turn recloses switch S11a and re-energizes solenoid 252. When power is entirely off, of course, solenoid 252 is de-energized and spring 254 causes fluid to be supplied to the rod-end of the cylinder to push out the carriage.

When carriage 46 with its operating stud 100 moves out it opens switch S4 and the blade of this switch closes a switch S4a. Switch S4a is in the circuit of a gate pilot relay R12 which is energized as soon after S4a is closed as the electric eye closes its switch S13. Energization of relay R12 closes its lock-in switch S12 and another switch S12a which energizes gate solenoid 52 to hold out the gate 118. Safety switch S6 is in parallel with switch S13, hence the returning approach of the carriage to the gate will cause the gate to be withdrawn even if it has accidentally been released. Switch S6, in the specific form illustrated, will also be closed by cam 139 on the outward movement of the carriage but this will have no effect because parallel switch S13 is already supposed to be closed. The opening of switch S4a upon the return of the carriage releases the gate for renewed control by the electric eye on the next cycle of movement.

When switch S2 is closed by the carriage having reached the dies this energizes die pilot relay R14 to close its switch S14. Closure of switch S14 energizes press valve solenoid 260 to move valve 261 against its spring 262 and causes motive fluid from inlet pipe 263 to be supplied to the head end and fluid from the rod end to be exhausted through outlet pipe 264. This causes the movable press die member to be closed. A stroke counter 265 and a pilot lamp 266, which are in parallel with solenoid 260, are also actuated when switch S14 is closed.

Closure of the die carrying actuator 97 opens switch S3 to cause return of the carriage, as before described. The showing of the die as fluid actuated is only symbolical for purposes of illustration and applies as well to a cam actuated press having a constantly rotating shaft and a clutch solenoid for actuating the dies.

The main circuit of L1, L2 is provided with a stop switch S15, a maximum heat-opening switch S16, a minimum fluid pressure closing switch S17, a line switch S18, a double blade master switch S19, signal lamps 270 and 271 for "circuit on" and "fluid pressure" respectively, and a relay R20 for closing the multiple switch S20 of the hopper drive motor M1 when the master switch is closed.

It is thus seen that the invention provides closely coordinated heating and delivery means for articles to be forged. The heating coils supply most heat at the first station and enough heat at the second station to keep the outside up to temperature while the first heat is soaking into the center of the stock. The coils are oppositely wound to minimize heating of the stems or shanks of the studs. This avoids heating the transfer jaws and related parts, the studs remaining about cold enough to be touched by hand, and also provides relatively unyielding grip on the stems so the heads may be very accurately positioned in the dies.

The apparatus assures that the workpieces are very positively held throughout the entire travel from heating position to dies and until they are gripped in the dies ready for the shaping die to act upon the head. In dealing with a deep-throated die, such as the present invention contemplates, it is highly important that the workpieces be firmly held and accurately fed because it is difficult to see into the throat and if a piece is improperly fed it may break the dies.

It is also important to have the movement of the dies interlocked with and made dependent upon the movement of the workpiece.

The reject mechanism is very dependable, being settable at the electric eye within a few degrees of any desired heat, since it throws out any workpiece which might cause injury to the dies. This is effective at all times but normally acts only when the machine begins operation.

If there should be a permanent misadjustment, there are a number of ways to correct it. The Graham drive has unlimited speed adjustment to speed up passage through the machine; the coil current is adjustable through a wide range; the cams are all adjustable to vary the feed-down movements within permissible limits; and as an alternative the interrupter cam of any selected dwell may be cut into action to regulate the periods of heating.

Full assurance is provided that all parts are in proper position throughout all actions and especially that the carriage is checked in back position before a stud drops down from final heating position.

The feeding carriage and jaws are of an especially convenient, sturdy and dependable construction. The parts are capable of very high speed operation, the machine illustrated having given ten or more times the best speed ever attained by hand feed. The product also is more uniform than that of hand feed operations.

The heating units are shown as molded around the coils but this may comprehend a replaceable headed refractory tube within the coils, the type of material required being well known.

While one embodiment of the invention has been illustrated and described, it is to be understood that there may be various embodiments within the limits of the prior art and the scope of the subjoined claims.

What is claimed is:

1. Article heating apparatus comprising in combination, article heating means, a carriage for removing a heated article, timed power means for feeding an article from the heating means to the carriage, and means responsive to the presence or absence of the carriage for feeding an article or for stopping the feeding and heating means at a feeding time.

2. Article heating apparatus comprising in combination, article heating means, article transfer means, article receiving means, means responsive to the arrival of an article at the receiving means for actuating the receiving means to take the article, means responsive to the article-taking movement of the receiving means for causing the return of the transfer means, and means responsive to the return of the carriage to the heating means for feeding another heated article thereto and causing the carriage to move out from the heating means.

3. Article heating apparatus comprising in combination, article heating means, article transfer means, article rejecting means, means responsive to the heat of an article for actuating and holding said rejecting means, and means responsive to the return of the transfer means to the heating means for releasing the rejecting means to renewed control thereof by the heat-responsive means.

4. Article heating apparatus comprising in combination, article heating means, article transfer means, article receiving means, and article intercepting means, said transfer means including a carriage, a jaw mount pivoted thereon, a pair of jaws pivoted on the mount, means for resiliently holding the jaws closed, and means for resiliently holding the mount with the jaws in central position, stop means for one of the jaws when the mount is swung toward the other jaw for releasing an article from the jaws, and said intercepting means including gate means to stop the carriage and means for turning the jaw mount to one side.

5. Article heating apparatus comprising in combination, article heating means, article transfer means, article receiving means, and article intercepting means, said transfer means including a carriage, a jaw mount pivoted thereon, a pair of jaws pivoted on the mount, means for resiliently holding the jaws closed, and means for resiliently holding the mount with the jaws in central position, stop means for one of the jaws when the mount is swung toward the other jaw for releasing an article from the jaws, and said intercepting means including gate means to stop the carriage and means for turning the jaw mount to one side, and means being controlled by the heat of an article in said jaws for actuating said gate means.

6. Article heating apparatus comprising in combination, article heating means, article feeding means, article transfer means, a constantly operating cam shaft for operating said feeding means, means on said cam shaft for causing interruption of the heating means once each revolution, and means responsive to the presence of the transfer means in article receiving position for continuing the bridging of the interruption period and causing said heating means to continue in operation for another revolution of the cam shaft.

HAROLD A. STRICKLAND, JR.
BENJAMIN R. PURVIN.
DONALD W. RIDDELL.

REFERENCES CITED

The following references are of record in the file of this patent:

UNITED STATES PATENTS

| Number | Name | Date |
| --- | --- | --- |
| 939,109 | Switzer | Nov. 2, 1909 |
| 1,697,757 | Dahlstrom | Jan. 1, 1929 |
| 1,859,956 | Canfield | May 24, 1932 |
| 1,929,212 | O'Neill | Oct. 3, 1933 |
| 1,951,426 | Littler | Mar. 20, 1934 |
| 2,020,657 | Riley | Nov. 12, 1935 |
| 2,063,800 | Fredrickson | Dec. 8, 1936 |
| 2,098,030 | Donovan | Nov. 2, 1937 |
| 2,202,758 | Denneen et al. | May 28, 1940 |
| 2,205,182 | Whitten | June 18, 1940 |
| 2,288,644 | Purtell | July 7, 1942 |
| 2,329,188 | Denneen et al. | Sept. 14, 1943 |
| 2,415,376 | Strickland | Feb. 4, 1927 |
| 2,440,316 | Unterweiser | Apr. 27, 1948 |